United States Patent [15] 3,641,809
Bermel [45] Feb. 15, 1972

[54] VORTEX-GENERATING SENSOR

[72] Inventor: Thomas W. Bermel, Durham, N.H.
[73] Assignee: Corning Glass Works, Corning, N.Y.
[22] Filed: June 1, 1970
[21] Appl. No.: 42,154

[52] U.S. Cl. .......................................................73/37.5
[51] Int. Cl. ..........................................................G01b 13/12
[58] Field of Search ...............................73/37.5–37.7, 505, 73/194 C; 137/81.5

[56] References Cited

UNITED STATES PATENTS 3,481,180 12/1969 Jones.........................................73/37.5
3,545,256 12/1970 Beeken.....................................73/37.5

Primary Examiner—Louis R. Prince
Assistant Examiner—William A. Henry, II
Attorney—Clarence R. Patty, Jr. and Walter S. Zebrowski

[57] ABSTRACT

A fluid-driven sensor for detecting and indicating the presence of a foreign object in the path of a fluid medium having a cylindrical vortex generation chamber, a supply port for introducing a driving fluid into the generation chamber, a vortex egress port communicating with a central portion of the generation chamber for permitting the driving fluid to escape from the generation chamber, and a sensing port by means of which the pressure within the central portion of the generation chamber is sensed.

10 Claims, 7 Drawing Figures

PATENTED FEB 15 1972
3,641,809
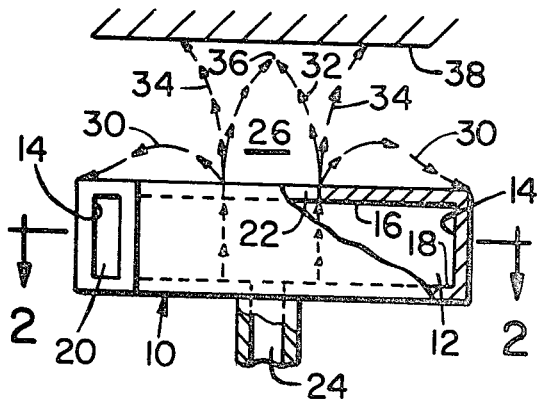
Fig. 1
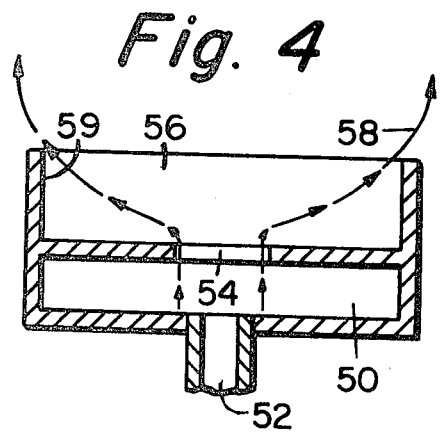
Fig. 4
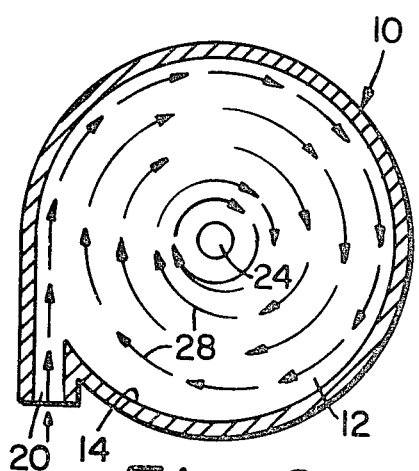
Fig. 2
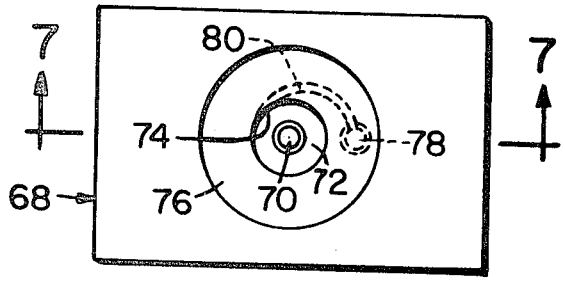
Fig. 6
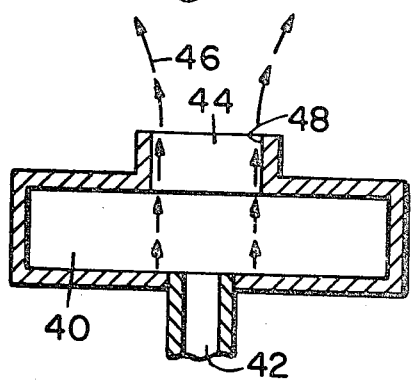
Fig. 3
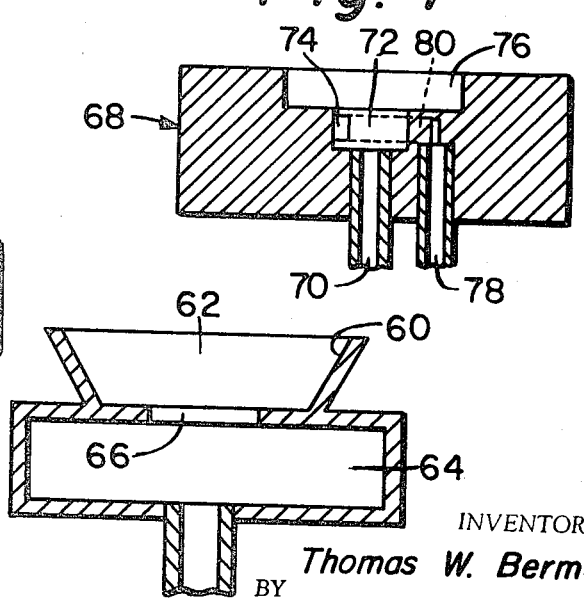
Fig. 7
Fig. 5
INVENTOR.
Thomas W. Bermel
BY Walter S. Zebrowski
ATTORNEY

VORTEX-GENERATING SENSOR

FIELD OF THE INVENTION

The present invention relates specifically to a fluid-driven vortex-generating device which is responsive to the presence of a foreign object in the path of a flowing fluid medium, said object being in sufficiently close proximity to the vortex egress to disrupt or disturb the flow pattern of the vortex.

An object of the invention is to provide a means for detecting or indicating the presence of a foreign object.

Another object is to provide a means for determining the position of a foreign object.

Still another object is to provide an efficient and economical noncontacting sensor.

SUMMARY OF THE INVENTION

Briefly, in accordance with the present invention a vortex-generating device is provided as a sensor for detecting and/or indicating the presence of a foreign object in the path of a fluid medium. Said sensor comprises a substantially cylindrical vortex generation chamber defined by a substantially cylindrical wall and two flat ends, with means being provided for introducing a driving fluid into the generation chamber. A vortex egress port in one of said flat ends communicates with a central portion of the generation chamber for permitting the driving fluid to escape or be exhausted from the generation chamber. Means is included for sensing the pressure within the central portion of the generation chamber.

Additional objects, features and advantages of the present invention will become apparent to those skilled in the art from the following detailed description and attached drawing on which, by way of example, only the preferred embodiments of this invention are illustrated.

BRIEF DESCRIPTION OF THE DRAWING

FIG. 1 shows an elevation, partly in section, of a sensor illustrative of one embodiment of the present invention.

FIG. 2 shows a cross-sectional plan view of the sensor of FIG. 1 taken along lines 2—2 thereof.

FIGS. 3 and 4 show cross-sectional elevations of two additional embodiments of the present invention.

FIG. 5 shows a cross-sectional elevation of a sensor of this invention wherein the direction chamber is tapered.

FIG. 6 shows a plan view of a sensor illustrative of still another embodiment of the present invention.

FIG. 7 shows a cross-sectional elevation of the sensor of FIG. 6 taken along lines 7—7 thereof.

DESCRIPTION OF THE PREFERRED EMBODIMENTS

Referring now to FIGS. 1 and 2 there is shown a vortex-generating device or sensor 10 characterized by a vortex generation chamber 12 of substantially cylindrical shape defined by substantially cylindrical peripheral defining wall 14 and flat end members 16 and 18, a fluid supply port 20 for introducing any suitable liquid or gaseous fluid into chamber 12, and a vortex egress port 22 formed in member 16 through which the fluid within chamber 12 can escape the device or sensor 10 in the form of a well-defined swirling fluid mass. A pressure-sensing port 24 communicates through member 18 with the central portion of chamber 12 as defined by the periphery of egress port 22 to provide means whereby the fluid pressure within vortex funnel 26 of the escaping fluid can be sensed or detected.

Supply port 20 should preferably communicate with chamber 12 so that peripheral defining wall 14 can be employed to guide the fluid thus introduced into a smooth circular flow pattern as indicated generally by the outer arrows in FIG. 2. After substantially one revolution around wall 14, the fluid follows a spiral pattern of flow 28 with continuously increasing velocity, characteristic of a vortex pattern, until it reaches the central portion of chamber 12 as defined by the periphery of egress port 22. Having acquired a component of force normal to flow pattern 28, the fluid egresses or escapes from sensor 10 through port 22 substantially about the periphery thereof to form one of several well-defined envelopes 30, 32, and 34 as generally represented in FIG. 1 by a series of arrows.

It is believed that the specific envelope configuration assumed by the fluid escaping through port 22 depends, at least in part, upon the relative magnitude of the fluid velocity normal to the path of fluid flow illustrated by pattern 28 with respect to the linear fluid velocity tangent to the path of fluid flow illustrated by pattern 28 at the periphery of port 22. For example, it has been observed that envelope 30, characterized by a radially diverging flow from port 22 which folds or laps back upon the surface defining port 22, occurs whenever the aforementioned normal velocity component is relatively small in relation to the aforementioned tangential velocity component. In such a situation, the pressure within vortex funnel 26 as detected at port 24 has been observed to be relatively close in value to the pressure of the ambient fluid surrounding sensor 10, assuming that envelope 30 is undisturbed by the presence of any obstruction. It would appear that this near equality between ambient pressure and the fluid pressure within funnel 26 is due to the relative ease with which ambient fluid may be entrained in funnel 26.

In a second flow situation or configuration, envelope 32 has been observed and is characterized by a bulblike converging flow pattern which completely closes upon itself and has an apex 36. It would appear that envelope 32 occurs when there is such low pressure in vortex funnel 26, that the funnel, although attempting to entrain ambient fluid therein, cannot entrain a sufficient quantity thereof. The pressure differential across the flow pattern is therefore sufficiently great to force the envelope 32 to converge upon itself to form a closed pattern having apex 36.

A third flow situation or configuration represented by the envelope 34 has been observed where both liquid and gaseous driving fluids and ambient mediums have been employed whenever the aforementioned normal fluid velocity component is relatively high with respect to the aforementioned tangential velocity component. Envelope 34 is generally characterized by its divergent vortex funnel 26 similar to a whirlwind. This particular flow configuration maintains its definition generally at a further distance from sensor 10 than do envelopes 30 and 32 previously explained, and for this reason is useful for detecting the presence of surfaces or obstructions at correspondingly greater distances. However, each of the envelopes 30, 32, and 34 can be employed satisfactorily in accordance with the present invention.

A typical example of the present invention is as follows. Referring to FIGS. 1 and 2, sensor 10 employs air as its driving fluid and emits a vortex of air from port 22 to form envelope 34. The ambient medium surrounding sensor 10 is also air. With no obstruction of envelope 34 by a foreign object or member, open ended envelope 34 is free to entrain a relatively large quantity of ambient air into vortex funnel 26 so that the pressure as detected at sensing port 24 is relatively close to that of ambient, although perhaps slightly less.

When a foreign object of any description, such for example as flat member 38, is brought in close proximity to sensor 10 as shown, entrainment of ambient air into the vortex funnel is at least in part obstructed. The effect of such an obstruction is to reduce the fluid pressure within funnel 26 by an amount easily detectable at sensing port 24. The reduction in pressure occurs since the foreign object prevents entrainment of as much ambient air as would otherwise be entrained into funnel 26 whereby the pressure difference between funnel 26 and ambient cannot be lowered to the same extent as would occur without the foreign object being present. Accordingly, a partial vacuum is drawn against member 38, the value of which is measurable at sensing port 24.

FIG. 3 illustrates another embodiment of the present invention comprising a cylindrically shaped vortex chamber 40, a pressure-sensing port 42, a fluid supply port, not shown, and a vortex egress port having an extended throat forming a direction chamber 44. The purpose of direction chamber 44 is to provide means for shaping or configuring the vortex fluid envelope 46 issuing from chamber 40. For example, by employing direction chamber 44, envelope 46 can be shaped to maintain definition at a greater distance from the sensor than is possible by using only a simple opening in chamber 40 as illustrated by egress port 22 in FIG. 1. It should be noted that both openings defined by egress port 22 in FIG. 1 and direction chamber 44 in FIG. 3 should be at least slightly larger in area and diameter than are their corresponding sensing ports 24 and 42 respectively. This relationship is necessary to insure egress of the driving fluid entirely through the desired exit, and avoids losses that could otherwise occur if a portion of the fluid were to issue through sensing ports 24 and 42. It has been found, however, that the invention is operative, although at relatively low efficiency, where egress port 22 and sensing port 24 in FIG. 1, for example, have identical diameters and areas. The fluid supply port for the embodiment of FIG. 3 may be as shown in FIGS. 1 and 2.

FIG. 3 is illustrative of a device wherein the diameter and area of the direction chamber 44 opening and that of the opening into chamber 40 are identical, that is wall 48 is cylindrical and common to both openings. This is not an essential requirement of the present invention as will be seen with reference to FIG. 4 in which is illustrated another embodiment of the present invention comprising a vortex chamber 50, a sensing port 52, and an egress port 54. This embodiment also comprises a direction chamber 56 which chamber has a considerably greater opening diameter and area than the diameter and area of egress port 54 with which it communicates. A typical fluid envelope 58 is shown to illustrate how the fluid issuing from the chamber 50 diverges into the relatively large direction chamber 56 and is ultimately shaped by defining walls 59 of chamber 56.

It is to be understood that although the direction chambers have been illustrated and described with walls substantially parallel to the longitudinal axes of the sensors, such walls may be shaped otherwise, for example a wall may be curved or may be shaped as illustrated by tapered wall 60 in FIG. 5. Wall 60 defines direction chamber 62 which communicates with vortex chamber 64 through egress port 66.

Referring now to FIGS. 6 and 7 there is shown a sensor 68 consisting of a pressure-sensing port 70, a vortex chamber 72, an orifice 74, and a direction chamber 76 communicating with vortex chamber 72. Any suitable liquid or gaseous driving fluid may be introduced into chamber 72 through an input port 78 from where it flows through an arcuated passage 80 to the orifice 74 and then into the chamber 72. The egress port of chamber 72 is formed by the opening in chamber 72 communicating with direction chamber 76. The operation of the sensor of this embodiment is the same as hereinabove described.

FIGS. 3 through 6 each show direction chambers communicating with the vortex chambers whereas FIGS. 1 and 2 show only a simple egress port 22 for the escape of fluid from chamber 12. Only a sensor, such as that shown in FIGS. 1 and 2, without a direction chamber can be used to provide a fluid envelope 30. Where a direction chamber such as 44 in FIG. 3 or 56 in FIG. 4 is employed, the resulting fluid envelope will be generally similar to that of envelopes 32 or 34 in FIG. 1. The direction chamber, therefore, provides the additional important feature of vortex shaping.

Although the present invention has been described with respect to specific details of certain embodiments thereof, it is not intended that such details be limitations on the present invention except insofar as set forth in the following claims.

I claim:

1. A vortex-generating sensor for detecting the presence of a foreign object in the path of a fluid medium comprising
   a substantially cylindrical vortex generation chamber defined by a substantially cylindrical wall and two substantially flat ends,
   a source of driving fluid,
   means connected to said source for substantially tangentially introducing said driving fluid into said generation chamber at the periphery thereof,
   means for sensing the pressure within said central portion of said generation chamber, and
   a vortex egress port formed in one of said flat ends substantially along the longitudinal axis of said generation chamber and communicating with the central portion of said generation chamber for exhausting said driving fluid vortex from said generation chamber in a manner such that a decrease of said pressure indicates the presence of said foreign object in the path of said exhausting driving fluid vortex, said pressure being a function of the distance of said object from said sensor, said egress port having a size in relation to the quantity of driving fluid being exhausted such that substantially all of the vortex driving fluid is exhausted about the periphery of said egress port with substantially no portion of the driving fluid being exhausted through the central portion of said egress port.

2. The sensor of claim 1 further comprising a vortex direction chamber defined by a substantially cylindrical wall the diameter of which is larger than the diameter of said egress port, said direction chamber communicating with said generation chamber through said egress port for affecting the configuration of said driving fluid issuing from said generation chamber.

3. The sensor of claim 1 wherein said sensing means includes a pressure-sensing port formed in the other of said flat ends, which port communicates with said central portion of said generation chamber substantially along the longitudinal axis of said egress port.

4. The sensor of claim 3 wherein the diameter of said egress port is larger than the diameter of said sensing port.

5. The sensor of claim 1 further comprising a vortex direction chamber communicating with said generation chamber for affecting the configuration of said driving fluid issuing from said generation chamber.

6. The sensor of claim 1 wherein said introducing means comprises a fluid supply port disposed to direct said driving fluid into said generation chamber along the peripheral defining wall thereof.

7. A vortex-generating sensor for detecting the presence of a foreign object in the path of a fluid medium comprising
   a substantially cylindrical vortex generation chamber defined by a substantially cylindrical wall and two substantially flat ends,
   a source of driving fluid,
   means connected to said source for substantially tangentially introducing said driving fluid into said generation chamber at the periphery thereof,
   a vortex egress port formed in one of said flat ends substantially along the longitudinal axis of said sensor,
   a vortex direction chamber defined by a substantially cylindrical wall the diameter of which is equal to the diameter of said generation chamber, said direction chamber communicating with said generation chamber through said egress port for affecting the configuration of said driving fluid issuing from said generation chamber, and
   means for sensing the pressure within said central portion of said generation chamber.

8. A vortex-generating sensor for detecting the presence of a foreign object in the path of a fluid medium comprising
   a substantially cylindrical vortex generation chamber defined by a substantially cylindrical wall and two substantially flat ends,
   a source of driving fluid,
   means connected to said source for substantially tangentially introducing said driving fluid into said generation chamber at the periphery thereof,
   a vortex egress port formed in one of said flat ends substantially along the longitudinal axis of said sensor,
   a vortex direction chamber defined by a substantially cylindrical wall the diameter of which is greater than the diameter of said generation chamber, said direction chamber communicating with said generation chamber through said egress port for affecting the configuration of said driving fluid issuing from said generation chamber, and means for sensing the pressure within said central portion of said generation chamber.

9. A vortex-generating sensor for detecting the presence of a foreign object in the path of a fluid medium comprising a substantially cylindrical vortex generation chamber defined by a substantially cylindrical wall and two substantially flat ends, a source of driving fluid, means connected to said source for substantially tangentially introducing said driving fluid into said generation chamber at the periphery thereof, means communicating with a central portion of said generation chamber through one of said flat ends for exhausting said driving fluid from said generation chamber, a vortex direction chamber defined by a tapered wall connected at its smaller end to said means for exhausting said driving fluid from said generation chamber, said direction chamber communicating with said generation chamber for affecting the configuration of said driving fluid issuing from said generation chamber, and means for sensing the pressure within said central portion of said generation chamber.

10. A vortex-generating sensor for detecting the presence of a foreign object in the path of a fluid medium comprising a substantially cylindrical vortex generation chamber defined by a substantially cylindrical wall and two flat ends, a source of driving fluid, means connected to said source for substantially tangentially introducing said driving fluid into said generation chamber at the periphery thereof, a vortex egress port formed in one of said flat ends substantially along the longitudinal axis of said sensor, a vortex direction chamber defined by a substantially cylindrical wall the diameter of which is at least equal to the diameter of said generation chamber, said vortex direction chamber communicating with said generation chamber through said vortex egress port for affecting the configuration of said driving fluid issuing from said generation chamber, and means for sensing the pressure within said central portion of said generation chamber including a pressure-sensing port formed in the other of said flat ends, which sensing port communicates with said central portion of said generation chamber substantially along the longitudinal axis of said egress port, the diameter of said egress port being larger than said sensing port.

* * * * *